United States Patent [19]

Sloan

[11] 4,244,428
[45] Jan. 13, 1981

[54] TOOL BAR WING FOLD RESTRAINING MECHANISM

[75] Inventor: Tom J. Sloan, La Porte, Ind.

[73] Assignee: Allis-Chalmers Corporation, Milwaukee, Wis.

[21] Appl. No.: 46,307

[22] Filed: Jun. 7, 1979

[51] Int. Cl.³ .............................................. A01B 73/00
[52] U.S. Cl. ..................................... 172/126; 16/191; 172/456
[58] Field of Search ............... 172/776, 456, 311, 466, 172/446; 280/639, 413; 16/191

[56] References Cited

U.S. PATENT DOCUMENTS

| | | | |
|---|---|---|---|
| 313,457 | 3/1885 | Tuerk | 16/191 |
| 3,797,580 | 3/1974 | Roth | 172/311 |
| 3,941,194 | 3/1976 | Orthman | 172/311 |
| 4,030,551 | 6/1977 | Boetto | 172/456 |
| 4,046,203 | 9/1977 | Ward | 172/456 |
| 4,074,766 | 2/1978 | Orthman | 172/311 |
| 4,116,282 | 9/1978 | Hansen | 172/311 |

FOREIGN PATENT DOCUMENTS 61461  4/1975 Australia .................................. 172/311

Primary Examiner—Richard J. Johnson

[57] ABSTRACT

A folding tool bar with hollow main and wing sections (12, 21, 22) incorporates restraining links (111, 112), disposed within the hollow main section (12) when the wing sections (21, 22) are lowered to their working positions, which not only serve to limit upward folding movement of the wing sections (21, 22) but also form a passageway for the hydraulic hoses (126, 127) extending from the interior of the hollow main section (12) to the interiors of the hollow wing sections (21, 22) thereby protecting the hoses (126, 127) against damage at the folding connections.

16 Claims, 9 Drawing Figures

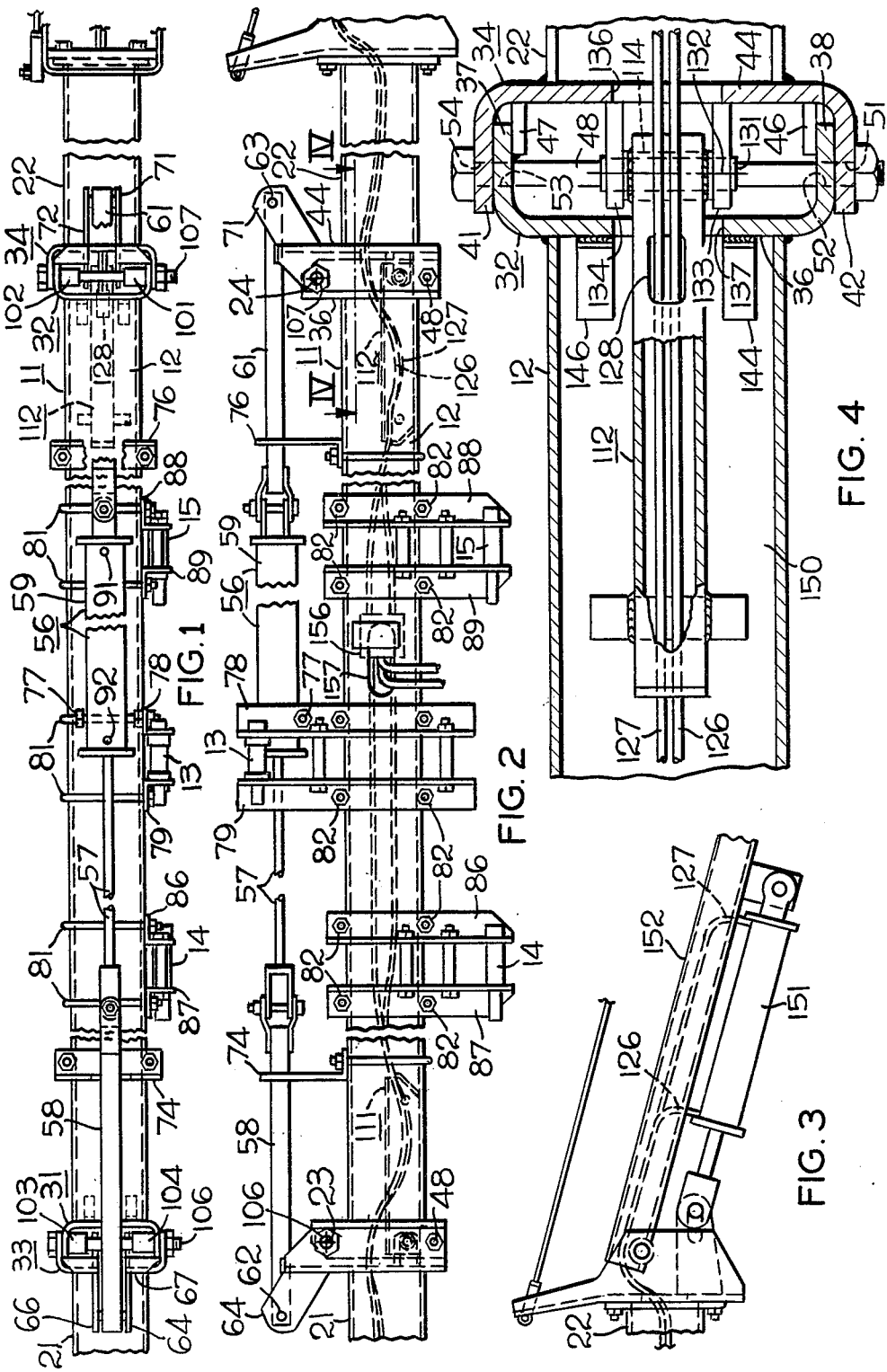

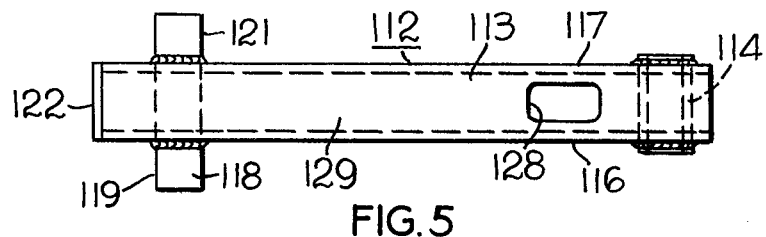
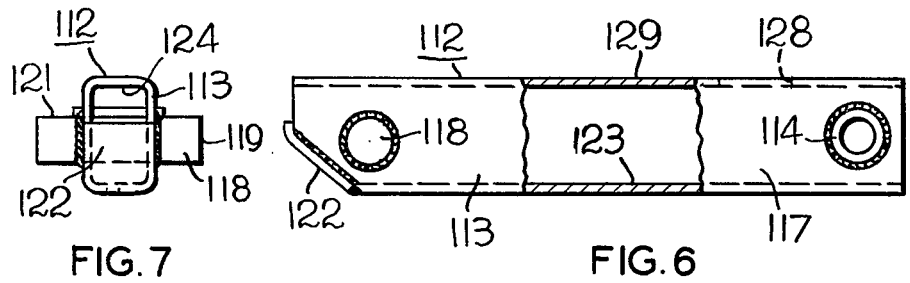
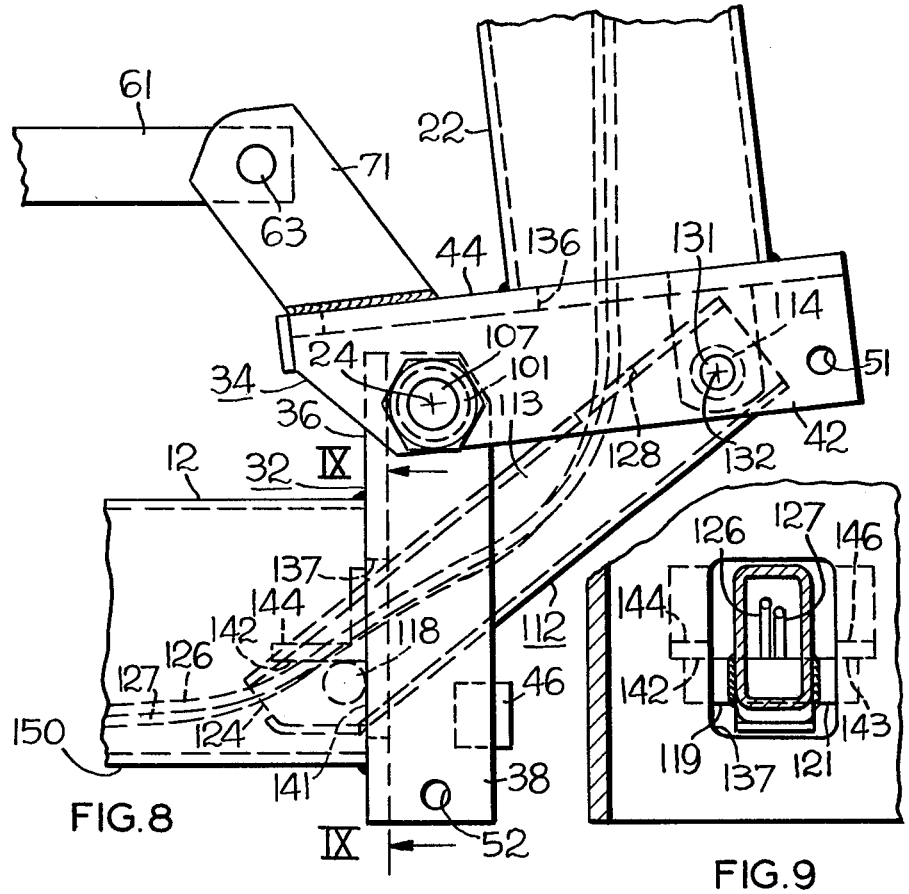

TOOL BAR WING FOLD RESTRAINING MECHANISM

TECHNICAL FIELD

This invention relates to an agricultural tool bar of the type adapted to be connected in draft relation to a tractor, and more particularly, pertains to a fold restraining mechanism for limiting the folding movement of a wing section of such a tool bar.

BACKGROUND OF THE INVENTION

Agricultural tool bars have been used for various purposes, such as for mounting various types of tillage tools including chisels and cultivators. In recent years, the tool bar has been advantageously used to mount single row planter units wherein the planter units can be adjusted to different row spacings. Foldable tool bars of this type are shown in previously issued U.S. Pat. Nos. 4,030,551; 4,116,282; 4,074,766; 4,046,203; and 3,941,194. In providing a foldable tool bar for planter units, it has been found to be particularly desirable to maximize the tool mounting space on the tool bar so as to permit the planter units to be adjusted to different row spacings. Heretofore, it has been a common practice to provide support brackets for folding wings of tool bars which extend upwardly therefrom so that when the wings are folded to their transport positions they will come to rest against the brackets. Such brackets reduce space on the tool bar which would otherwise be available for mounting and repositioning cultivator or planter units.

In some field operations, particularly planting, it is desirable to use a retractable land marker. Typically such markers are raised and lowered between transport and working positions by a linear hydraulic actuator interposed between the marker and the outer outboard end of the tool bar. Heretofore, it has been customary, when using such a hydraulically operated row marker, to run hydraulic hoses from the source of fluid pressure on the draft tractor along the exterior of the tool bar sections to the marker actuator. In this condition the hoses are unprotected and produce a cluttered appearance.

This invention is directed toward eliminating use of support brackets on the exterior of tool bars and providing instead a restraining mechanism for a folding tool bar wing which does not occupy space on the exterior of the tool bar. It is also an object of this invention to run the hydraulic hoses to the marker actuators by way of the interior of hollow tool bar sections and to use the restraining mechanism as means for protecting the hoses from damage at the folding connection between sections of the tool bar.

BRIEF DESCRIPTION OF THE INVENTION

A fold restraining mechanism is provided for limiting the vertical swinging movement of a wing section of a transverse tool bar relative to a main tool bar section secured in draft relation to a tractor. The main and wing tool bar sections have their adjacent ends pivotally connected to one another on a longitudinal, horizontal folding axis which is disposed above the tool bar sections. The fold restraining mechanism interconnects adjacent ends of aligned and pivotally interconnected main and wing tool bar sections. More specifically, the restraining mechanism includes a link which has one end extending into the hollow interior of one tool bar section and has its other end extending from the one tool bar section and pivotally connected to the adjacent end of the other tool bar section. The link is disposed below the folding axis, and a lost motion connection is provided between the link and the one tool bar section. The lost motion connection includes abutments on the link and the one tool bar section which engage to limit withdrawal of the link from the one section when the wing section swings to a folded transport position.

The link may be hollow for a substantial portion of its length and hydraulic hoses may pass through such hollow portion of the link, whereby the hoses are protected against damage at the folding axis between the wing and main sections of the tool bar.

First and second hinge members may be rigidly secured to the adjacent ends of the tool bar sections, which include ears in lapped relation to one another and connected to one another on the folding axis by appropriate pivot pin means. The hinge members may include vertically disposed central or web parts which are rigidly secured to the adjacent ends of the main and wing sections. The restraining link may be pivotally connected to brackets on the vertical central part of one of the hinge members and the vertical central part of the other hinge member may have a transverse opening for the link and carry a guide element cooperatively engaging the link to serve as part of the lost motion connection. The vertical central part of the hinge member to which the restraining link is pivotally attached may also include a transverse opening through which hydraulic hoses may pass.

BRIEF DESCRIPTION OF THE DRAWINGS

The invention is incorporated in a tool bar illustrated in the drawings in which:

FIG. 1 is a partial top view of a tool bar;

FIG. 2 is a partial front view of the tool bar shown in FIG. 1;

FIG. 3 is a partial front view of one end of the tool bar to which a row marker is connected;

FIG. 4 is a sectional view taken along the line IV—IV in FIG. 2;

FIG. 5 is a top view of the restraining link used in the present invention;

FIG. 6 is a side view of the restraining link shown in FIG. 5;

FIG. 7 is an end view of the restraining link shown in FIGS. 5 and 6;

FIG. 8 is an enlarged view of the pivot connection between the main and wing sections of the tool bar illustrated in FIGS. 1 and 2 showing the restraining link in a position restraining the wing section against further folding movement; and FIG. 9 is a partial sectional view taken along the line IX—IX in FIG. 8.

DETAILED DESCRIPTION OF THE DRAWINGS

Referring particularly to FIGS. 1 and 2, a transverse horizontal tool bar 11 includes a main, hollow tool bar section 12 which is adapted for connection in draft relation to a tractor by an upper draft pin 13 and a pair of lower draft pins 14, 15. The upper draft pin 13 is carried by a pair of upwardly extending angles 78, 79 secured to the central, main section 12 of the tool bar 11 by U-bolts 81 and nuts 82. The lower draft pins 14, 15 are similarly carried by downwardly extending angles 86, 87, 88, 89 secured to the main section 12 of the tool bar by U-bolts 81 and nuts 82. A pair of hollow wing, tool bar sections 21, 22 are connected to the transversely opposite ends of the main tool bar section 12 for vertical swinging movement about longitudinal horizontal folding axes 23, 24. In the condition illustrated in FIGS. 1 and 2, the wing sections 21, 22 are in their lowered working positions in which they are disposed in horizontal alignment with the main tool bar section 12 and, in effect, form lateral extensions of the main tool bar section 12. The main section carries a pair of similarly constructed hinge members 31, 32, which are welded to its laterally opposite ends. Likewise, the inboard ends of the wing sections 21, 22 have similarly constructed hinge members 33, 34 welded thereto which are complementary to the hinge members 31, 32.

Referring also to FIG. 4, the hinge member 32 includes a vertical, central web part 36 which is rigidly secured, as by welding, to one end of the main tool bar section 12 and includes a portion extending above the main section 12. A pair of transversely extending ears 37, 38 are presented by the hinge member 32, which are between and in lapped relation to a pair of transversely extending ears 41, 42 on the hinge member 34. The vertical central web part 44 of the hinge member 34 is rigidly secured, as by welding, to the adjacent, inboard end of the hollow wing section 22 and extends upwardly above the latter a substantial distance. The hinge member 32 has a pair of stop blocks 46, 47 welded to the lower, inner side of the ears 37, 38 thereof which serve to limit downward swinging movement of the wing section 22 and properly position the hinge members for insertion of a locking bolt 48 in aligned openings 51, 52, 53, 54 (shown in a nonaligned condition in FIG. 8).

After removal of locking bolts 48, the wing sections 21, 22 may be folded to an upright, overhead transport position by a power operated lift means which includes a hydraulic actuator or jack 56 which has its rod component 57 pivotally connected on a vertical axis to the inboard end of a lift link 58 and its cylinder component 59 pivotally connected on a vertical axis to the inboard end lift link 61. The outboard ends of the lift links 58, 61 are pivotally connected to the wing sections 21, 22, respectively, by way of longitudinally extending pivot pins 62, 63 having axes parallel to the folding axes 23, 24. The pivot pin 62 is mounted in vertical brackets 64, 66 which are welded to the outboard side of the vertical central part 67 of hinge member 33. Likewise, a pair of vertical brackets 71, 72 are welded to the outboard side of vertical central part 44 of hinge member 34 and extend in an upward, outboard direction therefrom. The brackets 64, 66 and 71, 72 are spaced a predetermined distance above the hollow wing sections 21, 22 so as to leave space on the exterior of the latter for attachment of tillage or planter units. The lift links 58, 61 and jack 56 are stabilized by a pair of guides 74, 76 secured to the main section 12 and a horizontal, longitudinally extending stud 77 secured to the angle 78 so as to be in a supporting relation to the underside of the cylinder when the wing sections are extended (lowered) to their working positions, as illustrated in FIGS. 1 and 2. The hydraulic jack 56 is a double acting hydraulic actuator connected to a source of fluid pressure, not shown, by hoses, not shown, connected to ports 91, 92 in the cylinder component 59. When the jack 56 is contracted, the wing sections 21, 22 will swing vertically about the longitudinal horizontal folding axes 23, 24 to overhead folded transport positions, such a position being shown for wing section 22 in FIG. 8.

The hinge member 32 includes aligned bosses 101, 102 welded to the inner sides of its ears 37, 38 and hinge member 31 includes aligned bosses 103, 104 welded to the inner sides of its ears. Longitudinal, horizontal pivot pins 106, 107, whose axes are the same as folding axes 23, 24, extend through the bosses 103, 104 and 101, 102 and through aligned openings in the ears of hinge members 33, 34.

When the wing sections 21, 22 are raised to their overhead folded transport position by contraction of lift jack 56, a pair of restraining links 111, 112 serve to restrain the wing sections 21, 22 from upward swinging movement beyond a predetermined angle of upward pivotal movement about the folding axes 23, 24. Only the restraining link 112 for wing section 22 will be described in detail, however, it should be understood that restraining link 111 for wing section 21 is similarly constructed. As shown in FIGS. 1, 2 and 4–9, the restraining link 112 is disposed below the folding axis 24 and includes a hollow, rectangular section tube 113 having at one end a cylindrical bushing 114 extending through aligned openings in the sidewalls 116, 117 and welded thereto. At the other end of the tube 113, a pin 118 extends, parallel to boss 114, through aligned openings in sidewalls 116, 117 and presents a horizontally extending guide structure in the form of a pair of oppositely extending cylindrical studs 119, 121 on opposite sides of the link 112. The pin 118 is welded to the sidewalls 116, 117. A skid shoe 122 is welded to sloping ends of sidewalls 116, 117 and to a bottom wall 123 leaving an opening 124 at the end of the link 112 through which hoses 126, 127 may extend into the interior and thence out a vertical opening 128 in a top wall 129 of the link 112. As shown in FIGS. 4 and 8, a pin 131, disposed on a longitudinal horizontal axis 132, is mounted in aligned openings in a pair of longitudinally spaced brackets 133, 134 welded to the vertical wall 44 of hinge member 34 and extends through the bushing 114 in one end of link 112. The brackets 133, 134 are disposed below a transverse opening 136 through which hoses 126, 127 extend into the hollow wing section 22. The other end of the link 112 extends through wall means defining a transverse opening 137 in vertical wall 36 of hinge member 32 and into the hollow interior of main section 12. When the wing section 22 is folded to the transport position shown in FIG. 8, the cylindrical exterior surfaces of the studs 119, 121 bear against the inboard surface 141 of the vertical web part 36 and against the downwardly facing surfaces 142, 143 on a pair of guide members 144, 146 secured as by welding to the vertical central part 36 at longitudinally opposite sides of wall means defining transverse opening 137 and in vertically spaced relation to the bottom wall 150 of section 12. The surfaces of studs 119, 121 and surfaces 141, 142, 143 serve as abutments limiting withdrawal of the link 112 from main section 12 whereby the wing section 22 is correctly positioned for transport.

When the wing section 22 is raised, the hoses 126, 127 are protected against damage at the folding pivot connection area by virtue of their passing from the horizontally disposed main section 12 to the upright wing section 22 by way of the hollow interior portion of the restraining link 112. The hoses 126, 127 supply pressure fluid to a double acting hydraulic jack 151, as shown in FIG. 3, which raises and lowers a land marker 152 pivotally connected to the outboard end of wing section 22. The inboard end of the hoses 126, 127 are connected to a junction box 156 which may also house a sequencing valve for land marker 152 and another land marker, not shown, on the outboard end of the wing section 21. The junction box 156 is positioned at an opening 157 adjacent the central draft connection part of the main tool bar section 12.

It should be noted that hinge member 32 is a weldment which includes guide members 144, 146, hinge bosses 101, 102 and stops 46, 47 and hinge member 34 is a weldment which includes brackets 133, 134 and brackets 71, 72. This avoids use of the main tool bar section 12 and the wing tool bar section 22 for directly supporting these components and also limits welding work on the tool bar sections to the weld connections between brackets and the sections. This helps keep the exterior of the sections available for mounting of tillage or planter units and avoids weakening the sections by additional welding of brackets and lost motion guides thereto. When the wing sections 21, 22 are in their lowered working positions, the restraining links 111, 112 are telescoped within the opposite ends of the hollow main tool bar section 12 and are hidden from view.

From the foregoing, it is apparent that a novel hidden wing fold restraining mechanism has been provided for a folding tool bar to maximize tool mounting space. Additional novelty is contributed by use of a restraining link which is hollow for a substantial portion of its length so as to accommodate passage of hydraulic hoses therethrough, thus affording protection for the hoses at the wing fold connection.

The embodiments of the invention in which an exclusive property or privilege is claimed are defined as follows:

1. In a tool bar having a main section adapted for connection in draft relation to a tractor and a wing section pivoted to the main section for vertical swinging movement about a horizontal folding axis between a horizontal working position in which the sections are in alignment and an upright transport position, a restrain mechanism for limiting the vertical swinging movement of the wing section relative to the main section characterized by said horizontal axis being disposed above said sections when said wing section is in its working position,
one of said sections being hollow,
a link disposed within said one section having one of its opposite ends extending therefrom and pivotally connected to the adjacent end of the other of said sections on an axis parallel to and spaced from said folding axis, and
a lost motion connection between the other end of said link and said one section including
abutment surfaces on said link and said one section limiting withdrawal of said link from said one section when said wing section is swung to its upright transport position and
guide means within the hollow interior of and carried by said one section operatively associated with said other end of said link so as to maintain the latter at the bottom portion of said hollow interior of said one section when said wing section is in its transport position.

2. The tool bar of claim 1 wherein said one section is said main section.

3. The tool bar of claim 1 or claim 2 wherein said link has a hollow interior for a substantial portion of its length and further comprising hydraulic hoses extending between said sections by way of said hollow interior of said link whereby said hoses are protected against damage at said folding axis.

4. A tool bar comprising
a hollow main tool bar section adapted for connection in draft relation to a tractor in horizontal transverse relation thereto,
a hollow wing tool bar section,
hinge means pivotally connecting adjacent ends of said sections to one another about a horizontal folding axis whereby said wing section may swing vertically about said folding axis between a working position in which said sections are in transverse horizontal alignment and a folded overhead transport position, said hinge means including
a first hinge member having
a central vertical part rigidly secured to said adjacent end of said main section,
a pair of longitudinally spaced ears extending toward said wing section including portions disposed above said main section,
a second hinge member having
a central vertical part rigidly secured to said adjacent end of said wing section and
a pair of longitudinally spaced ears in lapped relation to said ears on said first hinge member including portions extending above said wing section,
pivot pin means pivotally interconnecting said portions of said ears on said folding axis and
wall means defining a transverse opening in said vertical part secured to one of said sections,
a restraining link extending through said transverse opening and pivotally connected at one of its ends of said vertical part on the other of said sections on a horizontal axis parallel to said folding axis, said restraining link including an interior passageway intermediate its opposite ends,
wall means in said vertical part on said other section defining a transverse opening,
flexible hydraulic conduit means extending between said sections which pass through said interior passageway and through said transverse opening in said vertical part on said other section and
a lost motion connection between the other end of said link and said one section including abutment surfaces limiting withdrawal of said link from said transverse opening whereby said wing section is restrained from swinging about said folding axis beyond a predetermined folded condition.

5. The tool bar of claim 4 and further comprising hydraulic actuating means for swinging said wing section about said folding axis including a pivot connection with said second hinge member on an axis spaced above and outboard of said folding axis when said wing section is in its working position.

6. The tool bar of claim 5 wherein a bracket is rigidly secured to said central vertical part of said second hinge member, in vertically spaced relation to said wing section, and is pivotally connected to said hydraulic actuating means.

7. The tool bar of claim 4 wherein said lost motion connection includes a guide member rigidly fixed to said central vertical part secured to said one section, said guide member having a horizontal portion extending into the hollow interior of said one section in vertically spaced relation to the bottom of the latter.

8. The tool bar of claim 7 wherein said other end of said restraining link includes a horizontally extending guide structure engageable with said guide member.

9. The tool bar of claim 8 wherein said guide structure includes a stud extending horizontally from said other end of said restraining link.

10. The tool bar of claim 4 and further comprising a land marker pivotally mounted on the outboard end of said wing section for vertical swinging movement, a hydraulic jack operatively interposed between said wing section and said marker and wherein said conduit means is connected in fluid supplying relationship to said hydraulic jack.

11. A tool bar comprising
- a main tool bar section adapted for connection in draft relation to a tractor in horizontal transverse relation thereto,
- a wing tool bar section,
- hinge means pivotally connecting adjacent ends of said sections to one another about a folding axis whereby said wing section may swing about said folding axis between a working position in which said sections are in transverse horizontal alignment and a folded transport position,
- one of said sections being hollow,
- a link disposed within said one section having one of its opposite ends extending therefrom and pivotally connected to the adjacent end of the other of said sections on an axis parallel to and spaced from said folding axis, said link having a hollow interior for a substantial portion of its length,
- hydraulic hoses extending between said sections by way of said hollow interior of said link whereby said hoses are protected against damage at said folding axis, and
- a lost motion connection between the other end of said link and said one section including abutment surfaces limiting withdrawal of said link from said one section whereby said wing section is restrained from swinging about said folding axis beyond a predetermined folded condition.

12. The tool bar of claim 11 wherein said lost motion connection includes a guide member rigidly fixed to said one section and presenting a guide portion in the hollow interior of said one section extending in the direction of said one section parallel to and spaced from said folding axis.

13. The tool bar of claim 12 wherein said other end of said link includes a guide structure engageable with said guide member.

14. The tool bar of claim 13 wherein said guide structure includes a stud extending from said other end of said link.

15. The tool bar of claim 11 wherein said other section is hollow and said hoses extend from the hollow interior of said one section to the hollow interior of said other section by way of said link.

16. The tool bar of claim 15 and further comprising a land marker pivotally mounted on the outboard end of said wing section for vertical swinging movement, a hydraulic jack operatively interposed between said wing section and said marker and wherein said hoses are operatively connected to said hydraulic jack.

* * * * *